United States Patent [19]

Bornstein et al.

[11] Patent Number: 5,034,284
[45] Date of Patent: Jul. 23, 1991

[54] THERMAL FATIGUE RESISTANT COATINGS

[75] Inventors: Norman S. Bornstein, West Hartford; Michael A. DeCrescente, Wethersfield, both of Conn.

[73] Assignee: United Technologies Corporation, Hartford, Conn.

[21] Appl. No.: 521,616

[22] Filed: May 10, 1990

[51] Int. Cl.⁵ .................. B32B 15/00; B05D 1/00; B63H 1/26
[52] U.S. Cl. .................. 428/680; 416/241 R; 427/34; 427/405; 427/423; 428/925; 428/937
[58] Field of Search .............. 428/668, 680, 925, 937; 427/404, 405, 422, 34, 423; 416/241 R

[56] References Cited

U.S. PATENT DOCUMENTS

| | | |
|---|---|---|
| 4,152,223 | 5/1979 | Wallace et al. .................. 428/668 |
| 4,336,276 | 6/1982 | Bill et al. .................. 427/34 |
| 4,405,659 | 9/1983 | Strangman .................. 427/250 |
| 4,405,660 | 9/1983 | Ulion et al. .................. 427/250 |
| 4,759,957 | 7/1988 | Eaton et al. .................. 427/422 |

Primary Examiner—R. Dean
Assistant Examiner—Robert R. Koehler
Attorney, Agent, or Firm—Lawrence I. Field

[57] ABSTRACT

Thermomechanical fatigue failure in components in high performance gas turbine engines is diminished by providing the component with an overlay of a metallic coating and a strain isolating layer located between the surface of the component and the metallic coating overlay.

7 Claims, 1 Drawing Sheet

THERMAL FATIGUE RESISTANT COATINGS

This invention relates to improving the life of components in high performance gas turbine engines. Such components are usually fabricated from metal superalloys and are provided with coatings to protect the metal substrate from oxidation. Although suitable coatings prolong the life of turbine blades and other components to some extent, they are not entirely successful in protecting the components from thermal fatigue cracking, which occurs when the components are repeatedly heated to high temperatures.

Thermomechanical fatigue (TMF) failure is the development of a crack at the surface of a component induced by the thermal stresses combined with the mechanically induced centrifugal and gas bending loads. The protective coatings used to extend the life of gas turbine vanes and blades decrease or shorten the TMF life because the mechanical properties of the coating differ from those of the substrate and the coating behaves as the preferential site for crack initiation. In practice a thicker coating increases oxidation life but decreases TMF life. The reverse is equally true.

One presently practiced method for minimizing thermal fatigue cracking is to employ coating compositions which have coefficients of thermal expansion which are closely matched to those of the alloy of which the component is made.

Because some differences in coefficients of expansion inevitably exist, however small, this method does not entirely avoid thermomechanical fatigue cracking in view of the very large number of heating cycles to which components are exposed in service.

In the present invention a porous or oxide containing strain isolating zone is provided between the superalloy substrate and the oxidation resistant protective metal alloy overlay. As a result an article is produced exhibiting diminished susceptibility to development of thermomechanical fatigue cracks in the metal substrate.

BRIEF DESCRIPTION OF DRAWINGS

The invention will be more fully understood from the description which follows taken in conjunction with the drawings in which FIG. 1 schematically depicts a prior art turbine component

FIG. 2 shows a similar component, except for the provision of a strain isolating layer L on the substrate S before the deposition of the overlay coating C. Layer L can consist of the same chemistry as the outer protective layer but is applied in such a manner that the coating is porous and can contain numerous oxide particles. The function of layer L is to provide a region in which thermomechanical fatigue cracks initiate and terminate. Thus, this layer does not transfer the strain associated with design or temperature differentials or differences in coefficients of thermal expansion to the protective outer coating C. The modulus of the porous layer L is much less than the modulus of the dense coating C because of the presence of voids or oxides in layer L.

It has been found that to achieve the desired improvements in component life the thickness of the strain isolating layer L should not exceed 30% of the thickness of the outer oxidation resistance layer C which is conventionally 0.005 to 0.015 mils thick. The strain isolating or compliant layer can be deposited as in U.S. Pat. No. 4,336,276 by spraying a mixture of alloy and polymer particles and subsequently heating to eliminate the polymer, thereby producing a porous layer. Preferably the porosity of this layer is at least about 3% by volume.

The following series of experiments demonstrates this invention:

A NiCoCrAlY alloy was applied onto a nickel-base superalloy article by a conventional coating method. The coated article was heated to 2200 degrees F and rapidly cooled by immersion into ice/water solution. After two cycles, the surface exhibits what is commonly referred to as "mud crack" pattern, and the cracks terminate at the coating/substrate interface. This test demonstrated that the stresses associated with the quench are of sufficient magnitude to crack the coating.

A porous oxide containing layer was formed on the nickel-base alloy article using a commercially available plasma spray gun and spraying a powder of the same NiCoCrAlY alloy onto the article. Porosity and oxide inclusions are common in coatings produced by plasma spraying in air using argon as a cover gas. The coated nickel-base superalloy article was then heated to 2200 degrees F and quenched in a water/ice solution. Even after 25 cycles, no cracks were visible within the coating. In order to increase the severity of the test, liquid nitrogen was substituted for the water/ice solution. At the end of 10 additional cycles, a crack was noted within the coating. Metallographic analysis was performed and it was found that the crack through the coating originated within the superalloy substrate, propagating through the coating. Thus, a zone consisting of a porous layer resists cracking associated with the stresses induced by the thermal quench.

Figure 1:
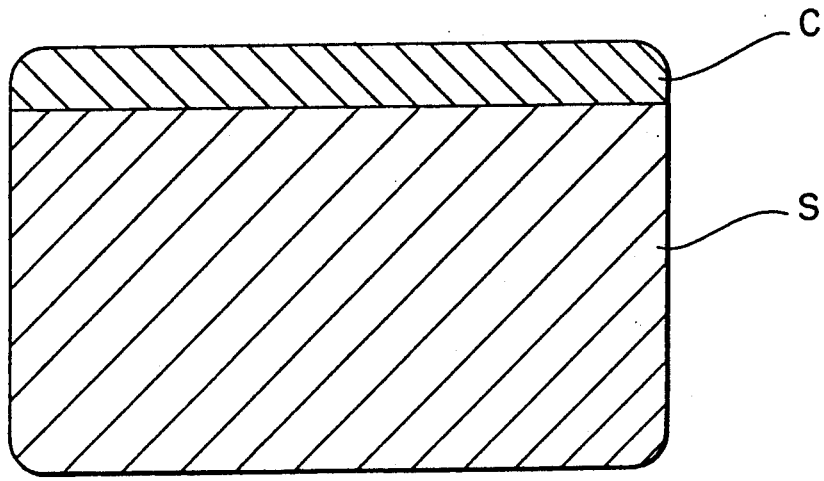
As shown in FIG. 1 the component comprises a substrate S consisting of a Ni-base superalloy of the type commonly used in this art and a metallic coating C deposited on the base by spraying, or by plasma spraying or by any suitable means, eg as described in U.S. Pat. Nos. 4,405,659 and 4,405,660 both issued Sept. 20, 1983.
Figure 2:
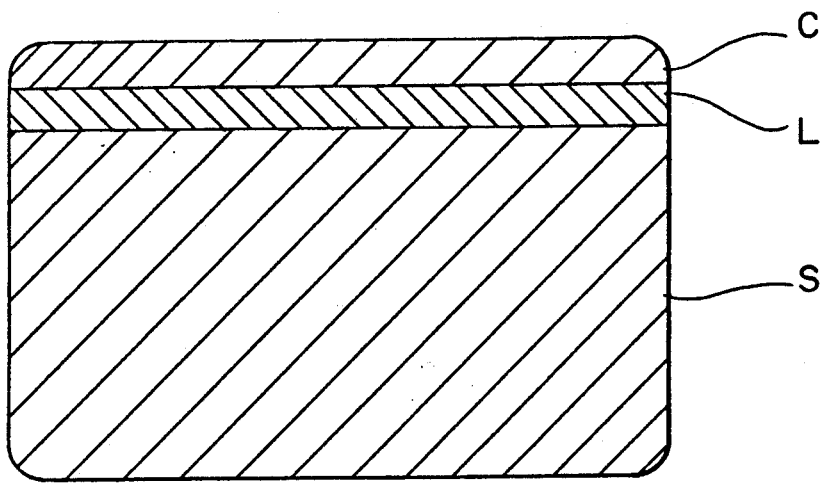
FIG. 2 is a similar view of the component produced according to the present invention.

In order to confirm that the protective system of FIG. 2 resists thermomechanical fatigue cracking, a superalloy article was provided with a NiCoCrAlY coating consisting of the porous inner layer L (the strain isolation layer) and an overlay C which imparts the desired oxidation/corrosion resistance. The article was heated to 2200 degrees F and quenched in an ice/water solution. Even after 25 cycles, no cracks were observed. Then the ice-water quenching media was changed to liquid nitrogen and the specimen was subjected to an additional 10 cycles. At this time the specimen was examined and a crack observed. As found by metallographic analyses, the crack originated within the specimen rather than at the coating. Thus it has been found that the use of a strain isolation layer can markedly increase the resistance to thermomechanical fatigue (TMF) failure of coated systems.

Having now described a preferred embodiment of the invention it is not intended that it be limited except as required by the claims which follow:

We claim:

1. In an article comprising a nickel base superalloy substrate and an oxidation resistant metal alloy coating thereon, the improvement which comprises reducing thermomechanical fatigue failure is said article by providing a compliant strain isolating layer between said substrate and said coating in which the thickness of said strain isolating layer does not exceed 30% of the thickness of the oxidation resistant layer.

2. The article of claim 1 in which the thickness of the oxidation resistant layer is about 0.010 to 0.015 mils thick.

3. The article of claim 1 in which the strain isolating layer is provided by spraying a mixture of metal alloy and organic polymer particles onto said substrate and subsequently heating the resulting article to eliminate the polymer and produce a porous layer.

4. A component of a turbine which is the article of claim 1.

5. A method of diminishing thermomechanical failure in a component of a high performance gas turbine which is to be coated with a protective metallic coating which comprises providing a porous metallic strain isolation layer on the surface of said component and thereafter applying the metallic coating on said porous layer, wherein the thickness of said strain isolation layer does not exceed 30% of the thickness of the protective metallic coating.

6. The method of claim 4 wherein the porous layer is provided by plasma deposition.

7. The method of claim 4 wherein the component is a nickel base superalloy and the outermost coating is a NiCoCrAlY alloy.

* * * * *